(12) United States Patent
Cepulis

(10) Patent No.: US 6,223,271 B1
(45) Date of Patent: Apr. 24, 2001

(54) SYSTEM AND METHOD FOR DETECTING SYSTEM MEMORY SIZE USING ROM BASED PAGING TABLES

(75) Inventor: Darren J. Cepulis, The Woodlands, TX (US)

(73) Assignee: Compaq Computer Corp., Houston, TX (US)

( * ) Notice: Subject to any disclaimer, the term of this patent is extended or adjusted under 35 U.S.C. 154(b) by 0 days.

(21) Appl. No.: 09/116,048

(22) Filed: Jul. 15, 1998

(51) Int. Cl.[7] .................................................. G06F 12/10
(52) U.S. Cl. ............................ 711/206; 711/102; 714/719
(58) Field of Search ................................. 714/718, 719, 714/70; 713/1, 2; 711/2, 102, 103, 172, 201, 206, 207, 221

(56) References Cited

U.S. PATENT DOCUMENTS

| | | | |
|---|---|---|---|
| 4,393,443 | * 7/1983 | Lewis | 711/207 |
| 4,680,700 | 7/1987 | Hester et al. | 364/200 |
| 4,926,314 | 5/1990 | Dhuey | 364/200 |
| 5,027,313 | 6/1991 | Culley | 364/900 |
| 5,481,688 | 1/1996 | Takagi | 395/418 |
| 5,500,826 | * 3/1996 | Hsu et al. | 365/230.01 |
| 5,564,052 | 10/1996 | Nguyen et al. | 395/800 |
| 5,640,528 | 6/1997 | Harney et al. | 395/416 |
| 5,737,563 | * 4/1998 | Shigeeda | 711/5 |
| 5,757,817 | * 5/1998 | Bolyn et al. | 714/719 |
| 5,854,795 | * 12/1998 | Osano | 714/718 |
| 5,909,592 | * 6/1999 | Shipman | 710/10 |
| 5,940,850 | * 8/1999 | Harish et al. | 711/102 |
| 6,035,420 | * 3/2000 | Liu et al. | 714/25 |

OTHER PUBLICATIONS

Bennett, "ROM Decoder for Memory Mapped Microprocessor Systems", Electronic Engineering, vol. 51, lNo. 622, p. 25. May 1979.*

* cited by examiner

*Primary Examiner*—Do Yoo
*Assistant Examiner*—Gary J. Portka
(74) *Attorney, Agent, or Firm*—Kevin L. Daffer; Conley, Rose & Tayon

(57) ABSTRACT

An apparatus and method are provided for detecting physical memory connected to a memory slot of a computer. The amount of physical memory within each bank is determined during boot up of the computer. Specifically, an extended physical address range exceeding $2^{32}$ bytes can be accessed and, therefore, detected from boot up code contained within a ROM. The ROM contains translation tables which allow a 32 bit linear address to be translated to a physical address which can reside at boundary address locations of the fill extended physical address range. Each boundary location can be tested by writing to and reading from the specific boundary addresses to determine if physical memory is present within a sector in which the boundary address page resides. The sectors are equally spaced across the physical address range so that boot up can detect physical memory sequentially along the sector boundaries, either beginning with the lowest addressable sector or beginning at the highest addressable sector.

8 Claims, 5 Drawing Sheets

SYSTEM AND METHOD FOR DETECTING SYSTEM MEMORY SIZE USING ROM BASED PAGING TABLES

BACKGROUND OF THE INVENTION

1. Field of the Invention

This invention relates to a computer and, more particularly, to an apparatus and method for detecting, during computer reset, the size of a contiguous physical memory size residing within one or more memory banks inserted into the computer.

2. Description of the Related Art

Modern microprocessors and/or computers address according to byte granularity. This means memory is generally organized and accessed as a sequence of bytes, and a byte address is used to address memory. Byte addressable memory encompasses what is generally referred to as memory address space.

The memory address space, and therefore processors operating from that space, can be segmented. Segmented addressing supports programs operating from separate and distinct address segments. For example, a program can keep its code (instructions), stack addresses, data and various global or local descriptor tables in separate segments independent from one another. This allows the execution environment within each of the various segments to operate independent of one another to achieve multi-tasking.

The execution environment of each segment can be paged. Paging is a mechanism of memory management which allows the most recently accessed pages to be held in physical memory instead of slower disk space. As such, physical memory herein refers to semiconductor memory involving a rather large contiguous address space which can be written to and read from. Generally speaking, physical memory may refer to random access memory (RAM). A benefit of paging is the ability to swap byte addressable space between physical memory and disk storage, where more recently addressed memory is chosen to reside in RAM rather than disk storage.

The location of pages, often referred to as page frames, reside in physical memory and is contained in a two-system data structure—a page directory and a page table. When coupled with segmentation, paging provides a mechanism for implementing a conventional demand-paged, virtual-memory system where sections of a program's execution environment are mapped into physical memory as needed. As such, paging allows a data structure to partly reside in physical memory and partly within disk storage. To minimize the number of bus cycles required for address translation, the most recently accessed page directory and page table entries can be cached in the processor in devices called translation lookaside buffers (TLBs).

Modern processors support several modes of operation, whereby addressing differs depending on which mode the processor currently resides. For example, a Pentium Pro® processor supports protected mode and real mode addressing schemes. In real mode, the microprocessor can address a limit of 1 Mbyte of real mode memory. However, in protected mode, the addressable memory can be extended to 4 Gbytes. The Pentium Pro® microprocessor resides in real mode following power-up or reset. However, a flag can thereafter be set in the control register of the processor to determine if the processor is to operate in protected mode.

Although protected mode allows the microprocessor to access more than 1 Mbytes of memory, many modern microprocessors such as the Pentium Pro® processor utilize an address bus exceeding 32 bits. This allows the address bus to access, for example, 36 bits of information comparable to $2^{36}$, or 64 Gbytes. In many server applications, it is desirable to use physical memory exceeding 4 Gbytes. However, to do so, paging is needed to translate from 4 Gbytes to 64 Gbytes. Conventional techniques for performing such translation is both time consumptive and burdensome.

Conventional paging and/or translation between a linear address space seen by a processor and physical address space of actual physical memory and disk storage occurs within page tables and page directories which form a part of, and are derived from, the physical memory. In order to translate between 4 Gbytes and 64 Gbytes, the page translation tables and directories must first be established within RAM, and then the formulated page translation tables will allow translation to the extended (greater than 4 Gbyte) range.

A problem exists, however, whenever the computer is first initialized during reset or boot up. During boot up, the computer must detect or "feel" for physical memory present within the computer. The detection process involves the processor determining physical memory size by writing to an address and reading from that address. The fact that the stored value equals the address read indicates that physical memory is present at least at that address. The concept of writing to and reading from an address proves advantageous over setting jumper wires or dual in-line package (DIP) switches.

If the translation tables are to be established in RAM, then boot up must entail detecting physical memory less than 4 Gbytes and then, from the detected memory space, establishing translation tables within a portion of that detected space. Only at this time can the extended memory range be detected from the translation tables.

The sequential operation of detecting a limited physical address range, then building translation tables within a portion of that range, and then finally detecting the remainder of the physical address space within the extended range exceeding 4 Gbytes adds significant time to the boot-up procedure. Thus, translation tables built within either cache or RAM pose significant limitations against being able to detect the entire 36-bit physical address range during a single boot-up step.

SUMMARY OF THE INVENTION

The problems outlined above are in large part solved by an apparatus and method for detecting an entire extended physical address range using translation tables stores in read only memory (ROM). The ROM can either be configured on a mezzanine bus (i.e., PCI bus) or a more distal bus, such as an ISA or EISA bus. The ROM maintains the translation tables in hardware, and is accessible whenever the processor is initiated during computer boot up or reset. The computer BIOS stored in ROM will load a control register within the processor, and that control register will point to a base address within a page directory pointer table (PDPI). The base address, coupled with a page directory entry and an offset of a linear address will access a physical address within a page equally spaced from other pages across the entire extended 64 Gbyte physical address range.

The combination of a linear address forwarded from the processor and the base address forwarded from a control register within the processor defines at least one address within a page among numerous pages within a sector. There may be numerous sectors evenly spaced across the physical address space so as to allow mapping or translation from a linear address to a physical address residing within a page and, more importantly, to one page within a sector. Separation between adjacent sectors are known as boundary addresses which can be written to and read from in order to test (or detect) physical memory present at that boundary.

Detecting physical memory at only one physical address within a sector, preferably at or near the boundary address, allows for quick determination of the extent (or size) of physical memory present within the entire physical address space, including the extended physical address range (e.g., physical address range extending above $2^{36}$ to $2^{36}$ bytes). By placing the translation tables within ROM, translation to the entire extended range available to the processor address bus can be achieved during boot up. This avoids the limitation of detecting only a portion of the physical memory space, build translation tables, and then detect the remaining, extended physical memory space as in conventional designs.

According to one embodiment, an apparatus is provided for detecting physical memory size within a computer system. The apparatus comprises ROM embodying a page translation table for translating a first address within a first address range to a second address residing possibly at a boundary address separated from another boundary address by a plurality of contiguous addresses within a second address range. The boundary address is therefore an address within a page located at the boundary within a sector closely adjacent another sector. The page translation table is accessed during initialization of the computer system. After the ROM-based translation tables has determined the whereabouts and size of physical memory, the page translation tables can thereafter be implemented, during post boot-up operation, within the physical memory space or RAM.

According to another embodiment, a computer is provided. The computer includes a processor and physical memory operably coupled to the processor. ROM is also operably coupled to the processor for receiving a plurality of linear addresses from the processor and for translating the linear addresses to a corresponding plurality of physical addresses equally spaced across the physical address space.

A method is further provided for detecting physical memory size within a memory bank. The method includes addressing ROM containing a page translation table which points to a base address within a memory page among a plurality of memory pages evenly spaced across the physical address size. Data is then written at an address offset from the base address. Data at the address previously written to is then read so as to compare the read data with the written data. If the comparison is such that the bits are equal, for example, then it is determined that physical memory is present within a sector of the memory bank containing the memory page.

BRIEF DESCRIPTION OF THE DRAWINGS

Other objects and advantages of the invention will become apparent upon reading the following detailed description and upon reference to the accompanying drawings in which.

Figure 1:
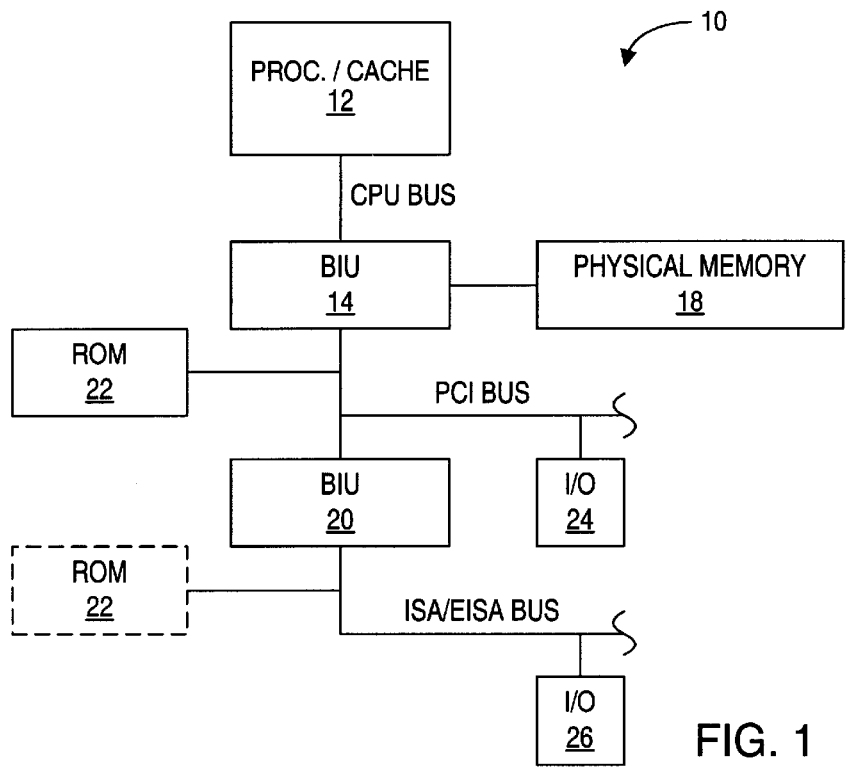
FIG. 1 is a block diagram of a computer system comprising various buses, bus interface units and a ROM in which page translation tables are stored.

While the invention may be modified and have alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning to FIG. 1, a computer 10 is illustrated having multiples buses, including a CPU bus (processor bus), a mezzanine or PCI bus, and a peripheral bus or ISA/EISA bus. The CPU bus connects a CPU or processor 12 to a bus interface unit or north bridge 14. A cache memory is preferably embodied within processor 12 and/or linked to processor 12 by the CPU bus. Bus interface unit 14 provides an interface between components clocked at dissimilar rates. Bus interface unit 14 preferably contains a memory controller which allows communication to and from physical memory 18. A suitable physical memory 18 comprises RAM.

Bus interface unit 14 is generally considered an application specific chip set or application specific integrated circuit (ASIC) that provides connectivity to various buses, and integrates other system functions such as memory interface and P1394. Physical memory 18 is considered the main memory and refers to a portion of physical address space that the majority of memory accesses target. A disk may also be present such that the combination of physical memory and disk is seen by the processor as virtual memory. The RAM or semiconductor memory is considered the largest continuous memory space of computer 10.

Coupled between the mezzanine bus and the peripheral bus is another bus interface unit 20 often referred to as a south bridge. Similar to interface 14, south bridge 20 operates to buffer transfers between buses of dissimilar clocking speeds. The interface units may also include an arbitration mechanism necessary to grant mastership of the buses to which they connect. According to one embodiment, ROM 22 is connected to the PCI bus. ROM 22 embodies specific instructions needed during reset, initialization or boot up of computer 10. Those instructions form a part of the BIOS execution. According to another embodiment, ROM 22 can be connected to the peripheral bus. In either instance, ROM 22 contains initialization software and, as will be described below, translation needed to access an extended range of physical memory space during initialization. Further shown are peripheral devices or input/output devices 24 and 26 which operate as master/slave units coupled to their respective buses for transferring input information or receiving output information. Input/output devices are well known in computer architecture. For example, devices 24 and 26 can include hard disk drives, floppy drives, an electronic display, and a printer, or any other device which is physically separate from a monolithic printed circuit board on which processor 12 is either directly or indirectly coupled. Devices 24 and 26 contained separate from the processor-embodied board are hereinafter referred to as peripheral devices. Thus, peripheral devices are mechanically separate from the printed circuit "motherboard" (i.e., board having sockets into which the processor-embodied board can be coupled, or sockets into which leads of the processor can be coupled).

Figure 2:
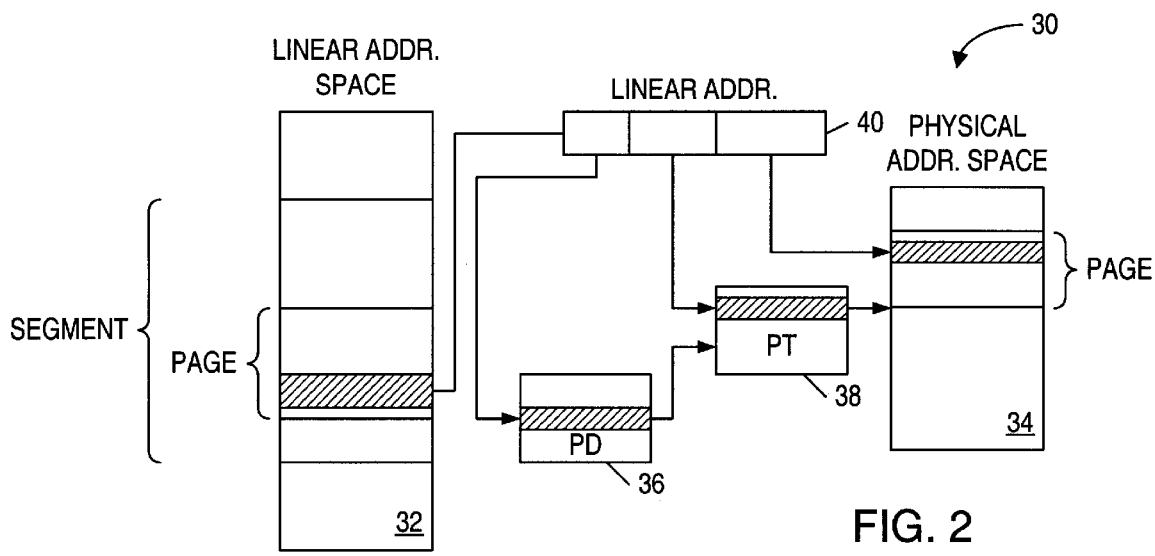
FIG. 2 is a block diagram of page translation from a linear address to a physical address in general.

FIG. 2 illustrates various translation tables 30 contained within ROM 22 of FIG. 1. The translation tables serve to translate between a linear address space 32 seen by the memory bus agent (i.e., the processor or input/output device) and a physical address space 34 associated with the physical memory. FIG. 2 thereby shows the general concept of paging, whereby the processor's address space (linear address space) is divided into protected address spaces called segments. Each segment is divided into a plurality of pages, which are stored either in physical memory or on the disk. When a program (or task) attempts to access an address location in the linear address space 32, the processor uses a page directory 36 and a page table 38 to translate the linear address into a physical address and then performs the requested operation (read or write) on the memory location. If the page being accessed is not currently in the physical memory of space 34, the processor interrupts execution of the program, reads the page into physical memory from the disk, and then continues executing the program.

The linear address dispatched by the processor is shown as reference numeral 40. Address 40 includes three address portions: a first portion used to determine offset within page directory 36, a second portion used to determine offset within page table 38, and a third portion used to determine offset within a page of physical address space 34. The base address of page table 38 is determined from the address forwarded from page directory 36, and the base address of a page within space 34 is determined by an address dispatched from page table 38. The conventional concept of segmentation and paging is generally well known and described in various articles, some of which include U.S. Pat. Nos. 5,481,688; 4,680,700; 5,564,052; and 5,640,528 (herein incorporated by reference).

Figure 3:
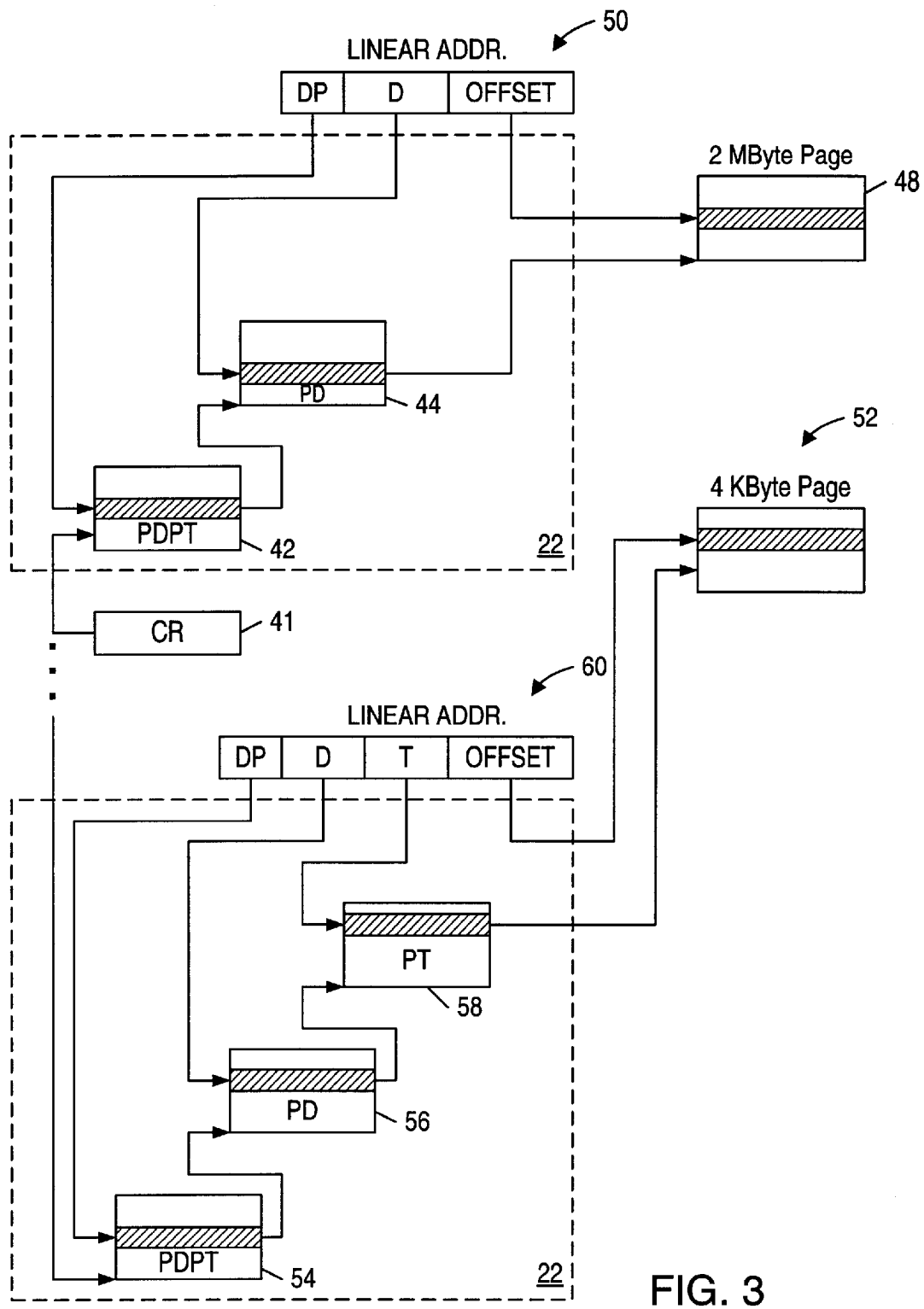
FIG. 3 is a block diagram of the ROM based page translation tables used to translate a linear address to one of a plurality of pages during times when the physical memory (or system memory) is being detected during computer boot up from ROM.

While the concept of translation from a linear address to a physical address within a physical address space is well known, performing translation during initialization of the computer system and, more specifically, during the time in which physical memory is detected is not well known. In fact, this concept forms at least a portion of the ROM-based page translation tables described herein below. FIG. 3 illustrates one such mechanism for converting a linear address to a physical address, such that the physical address can extend to the maximum capacity of the processor address bus. Modern processors, such as the Pentium Pro® implement a 36 bit address bus. However, the internal registers of the processor are limited to 32 bit registers mandated by the X86 instruction set. This means the linear address is limited to 32 bits. However, the physical address space can extend to $2^{36}$ or 64 Gbytes. It is thereby noted that in order to access beyond $2^{32}$, or 4 Gbytes, translation is needed. Translation however becomes a problem and is relatively burdensome during the initialization of the computer since conventional translation involves direct mapping (absent paging and/or translation) to physical memory in order to detect the size of physical memory and then once detection is complete, the translation tables are generated within the physical memory. The problem is further compounded if the physical memory of a modern microprocessor extends beyond 4 Gbytes.

According to one embodiment hereof, the linear address space is translated during initialization or boot-up of the computer, across the entire physical address space, and even within the extended physical address space exceeding 4 Gbytes. This feature is carried forth by placing the translation tables within the ROM itself.

Included within the processor is a control register, noted in the Pentium Pro® architecture as register CR3, or PDBR. Control register CR3 is shown as numeral 41, and encompasses any register within the processor which can be loaded by the BIOS routine so as to contain an address indicative of a base address for a page directory pointer table 42. Page directory pointer table (PDPT) 42 is contained within ROM 22 (shown in FIG. 1), as is page directory (PD) 44. In order to access the extended range, page directory pointer table 42 is added, beyond that shown in FIG. 2. Also, the size of entries within PDPT and PD tables 42 and 44, respectively, are increased from 32 bits to 64 bits, and the maximum number of entries in tables 42 and 44 is 512.

The outcome of page directory entry within page directory 44 points to a base address of a page shown, according to one embodiment, as a 2 Mbyte page 48. Linear address 50 thereby determines the offset within tables 42 and 44, and also determines the offset of the page frame 48 so that a specific physical address entry can be determined.

In addition to register CR3, the processor also contains various other control registers. For example, register CR0 contains a bit which determines whether page translation mechanism is to be enabled. It is noted that the processor operating mode begins in real mode, and then can change to protected mode by setting the paging flag within register CR0. Another register CR4 determines whether the page size will be a 2 Mbyte page or a 4 Kbyte page. The flag which enables either the 4 Mbyte or 2 Kbyte page length is dissimilar from another bit within register CR4 which is used to enable the extended 36 bit physical address. As such, a Pentium Pro® can accommodate a physical address of 64 Gbytes by simply enabling a bit within register CR4. Register CR0, CR3, and CR4 can be loaded during initialization of the computer by a simple software routine such as, e.g., MOV.

FIG. 3 illustrates another embodiment in which the page size extension flag is set for 4 Kbyte page size 52. In this embodiment, ROM 22 may include three tables, table PDPT 54, table PD 56, and another table (page table) PT 58. The combination of tables 54, 56, and 58 determine the base address of a 4 Kbyte page 52. A linear address 60 forwarded from the processor register will determine offsets within each of the various pages and an offset within the 4 Kbyte page frame 52.

According to the embodiment in which a 2 Mbyte page is used, it is noted that 2 bits may be attributed to determining the offset within PDPT table 42 and 9 bits can be used to determine the offset within PD 44. This provides a translation of 4×512 or 2K pages. The combination of 2K pages and a 2 Mbyte page size allows for access of 4 Gbytes of physical memory. However, accessing the full extended physical address space beyond 4 Gbytes can be achieved by changing the pointer in register 41 to point to another page directory pointer table, which in turn points to another set of page directories and page tables. Sixteen different sets of table 42, each having an associated table 44, can achieve 4Gbytes×16 or 64 Gbyte physical memory. If, however, a 4 Kbyte page is used, then the translation afforded by a 2 bit input to table 54, a 9 bit input to table 56, and a 9 bit input to table 58 provide 4×512×512, or $2^{20}$ (1 M) pages. The combination of 1 M pages and 4 Kbyte page size offers 4 Gbyte address range. However, when coupled with another 15 possible tables 54, and associated page tables 56 and 58, a full 64 Gbyte physical address range can be accessed.

Figure 4:
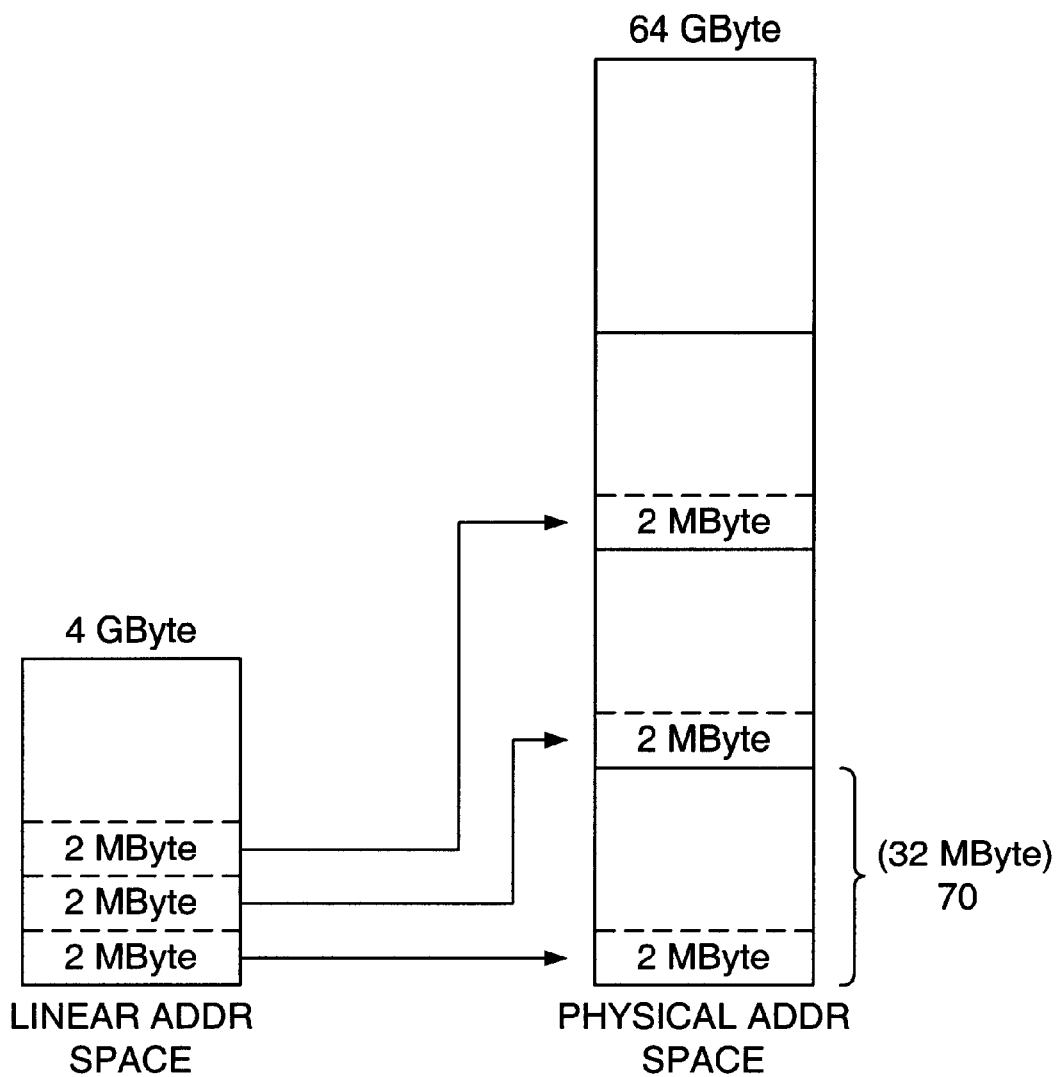
FIG. 4 is block diagram of memory address translation of the plurality of pages across granular boundaries of an extended physical memory detected during computer boot up from ROM.

FIG. 4 indicates, in more simplistic fashion, the translation offered by translation tables within ROM 22. More specifically, FIG. 4 indicates an embodiment in which a 2 Mbyte page is addressed, similar to the embodiment shown in FIG. 3. The base address of each 2 Mbyte page is addressed by the ROM-based translation tables. As noted earlier, translation can access two thousand 2 Mbyte pages. As shown in FIG. 4, each Mbyte page is located within a sector 70, and therefore there are 1,000 sectors 70 which make up a 64 Gbyte physical address size. In other words, translation afforded by ROM 22 (shown in FIG. 3) translates a plurality of 2 Mbyte pages spaced equal distances apart across the 64 Gbyte physical address range. In the example shown, each sector 70 is 32 Mbytes in size, equal to 16 potential changes in the pointer outcome from control register 41 (FIG. 3), whereby 16×2 Mbyte equals 32 Mbytes.

According to the example shown in FIG. 4, the granularity at which a 64 Gbyte physical memory is detected is established as a 32 Mbyte boundary. In this manner, the linear address space can access a boundary address within one page of each sector 70. The remaining pages and/or addresses within those pages need not be accessed in order to detect if physical memory is present within that sector. Accordingly, a sector represents the smallest amount of physical memory (granularity) than can be detected. Since translation affords a potential for 2K boundary addresses spaced across respective 2K separate pages, a 64 Gbyte physical memory can be detected during computer boot up exclusively from the ROM.

Figure 5:
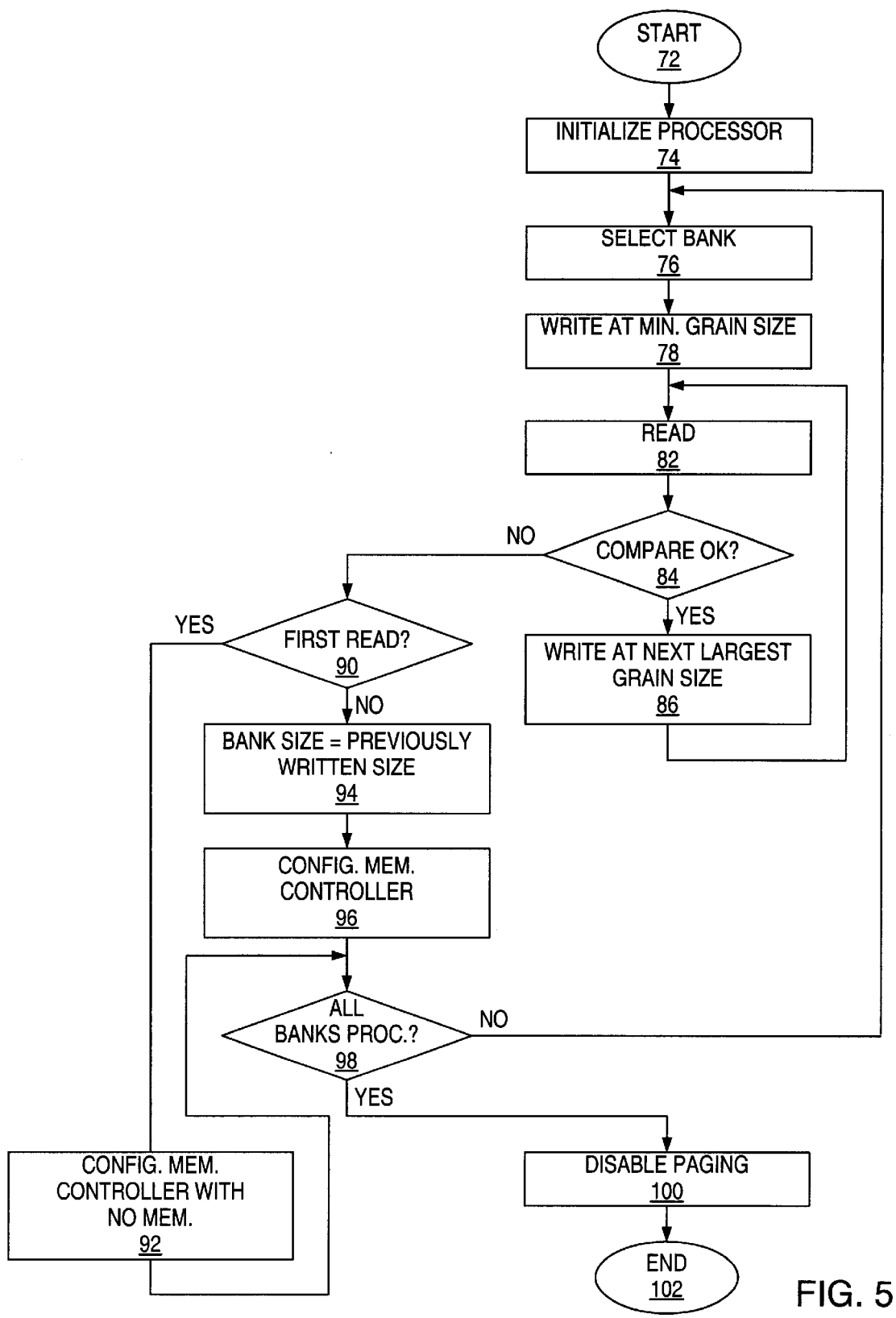
FIG. 5 is a flow diagram of steps used to detect the size of extended physical memory by incrementing upward along granular boundaries during computer boot up from ROM, according to one embodiment.

FIG. 5 illustrates a methodology, or series of steps, used to detect physical memory. Once the computer system is initiated during boot up or reset 72, the processor is initialized 74. This means the processor control registers are written to and all code, data, stack and system segments, as well as the global descriptor table or local descriptor table can be paged. Initializing the processor involves reading an address from control register CR3 once CR0 establishes protected mode, and the page size extensions as well as physical address extension bits are set in register CR4.

Given that the processor initializes the various registers, a select bank of memory can be detected among possibly numerous banks at step 76. Beginning with that bank only, a write operation occurs at the minimum grain size 78. According to the example shown in FIG. 4, the minimum grain size is established by sector 70 as a 32 Mbyte grain size. In this manner, the lowest addressable sector is written to preferably a boundary immediately above the lowest address of the physical address space. Thereafter, the data written to that address boundary is read 82. If comparison 84 yields read data equaling written data 82, then it is determined that physical memory resides within the lowermost sector. This allows the next sector to be written 86. Preferably, the boundary address immediately above the lowest sector is written to. Thereafter read 82 occurs for each sector extending upward toward the highest available sector.

If the first sector read information is not consistent with the data written to that sector boundary address, then determination must be made on whether this is the first read operation, i.e., whether this is the first sector or lower most sector within the physical address range 90. If so, then it is noted there is no physical memory present within that bank, and the memory controller is configured accordingly at step 92.

If, however, the sector being read is not the lowermost sector, then once the comparison of a sector is not favorable, the bank size is determined to be the previously written sector or sectors 94. The memory controller is configured accordingly 96.

The process of determining the presence of physical memory across sectors of an extended physical address space must be repeated for each bank which forms that space. Thus, determination 98 must be made as to whether all banks were processed, i.e., whether all banks have been detected. If not, then the entire process shown in FIG. 5 is repeated again for the remaining banks. If, however, all the banks have been processed, then step 100 occurs to allow paging to be disabled. This means that the pertinent bits within register CR0, CR3, and CR4 are cleared before memory detection is ended 102.

Figure 6:
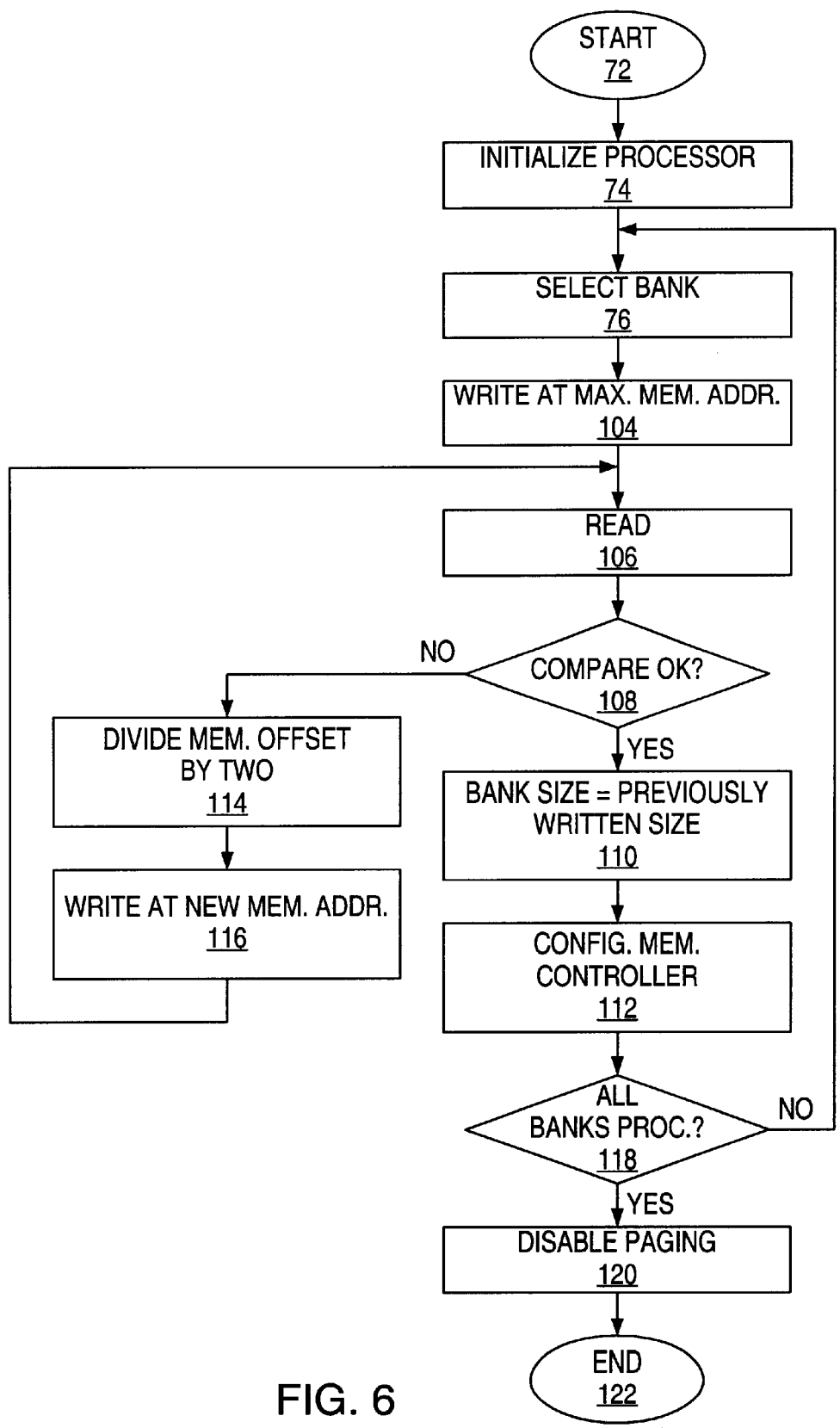
FIG. 6 is a flow diagram of steps used to detect the size of extended physical memory by decrementing downward along granular boundaries during computer boot up from ROM, according to another embodiment.

FIG. 6 illustrates an alternative methodology for detecting physical memory. Steps 72, 74, and 76 are similar to that shown in FIG. 5. However, instead of writing at the minimum grain size, writing occurs at the maximum addressable space within the selected bank. This is dictated by the SIMM hardware size which a bank can accommodate. Write step 104 occurs at an address boundary of a page within the maximum memory address. The address which was written to can then be read 106 to determine if memory resides at that address. Thus, a comparison 108 is performed. If the read and write data favorably compares, then the bank size is equal to the previously written size 110, and the memory controller is configured accordingly 112.

If the read data does not favorably compare, then the maximum memory address is divided by two. For example, a 1 Mbyte maximum bank size can be reduced to 512 K via step 114. A new address within the reduced size can then be written to 116 and read from 106 to determine if memory has retained the written to data. If not, the process is repeated by dividing the memory offset by another factor of two (e.g., to 256 K, etc.) Once favorable comparison is achieved, then the previously written size is determined to be the proper bank size.

The aforementioned process is repeated for all banks 118. Once physical memory in each bank has been detected and quantified, then paging is disabled and the process is ended as shown by steps 120 and 122.

It will be appreciated to those skilled in the art having the benefit of this disclosure that the embodiments described herein are believed to be capable of detecting a physical address range exceeding $2^{32}$ using translation tables contained within the boot up hardware of a ROM. It is intended that the following claims be interpreted to embrace various modifications and changes to the embodiments described herein. Accordingly, the specification and drawings are to be regarded in an illustrative rather than a restrictive sense.

What is claimed is:

1. A method for detecting physical memory size within a memory bank, comprising:
    addressing a read only memory (ROM) containing a page translation table which points to a base address within a memory page among a plurality of memory pages evenly spaced across the physical memory size;
    writing data at an address offset from the base address;

reading data at the address previously written to;

comparing the read data with the written data to determine if physical memory is present within a sector of the memory bank containing the memory page; and repeating said addressing, writing, reading, and comparing steps for at least a portion of the plurality of memory pages in sequentially increasing page order beginning with the page having the smallest address within the physical memory size, wherein said addressing, writing, reading and comparing occur during boot up of a computer embodying the memory bank.

2. The method as recited in claim 1, wherein said comparing comprises recognizing physical memory size within the memory bank as being equal to the largest sector containing an address at which the read data equals the written data.

3. The method as recited in claim 2, further comprising configuring a memory controller with the recognized physical memory size.

4. The method as recited in claim 1, wherein said addressing comprises pointing to a base address greater than $2^{32}$ bytes of contiguous physical memory.

5. A method for detecting physical memory size within a memory bank, comprising:

addressing a read only memory (ROM) containing a page translation table which points to a base address within a memory page among a plurality of memory pages evenly spaced across the physical memory size;

writing data at an address offset from the base address;

reading data at the address previously written to;

comparing the read data with the written data to determine if physical memory is present within a sector of the memory bank containing the memory page; and repeating said addressing, writing, reading, and comparing steps for at least a portion of the plurality of memory pages in sequentially decreasing page order beginning with the page having the largest address within the physical memory size, wherein said addressing, writing, reading and comparing occur during boot up of a computer embodying the memory bank.

6. The method as recited in claim 5, wherein said comparing comprises recognizing physical memory size within the memory bank as being equal to the smallest sector containing an address at which the read data equals the written data.

7. The method as recited in claim 5, further comprising configuring a memory controller with the recognized physical memory size.

8. The method as recited in claim 5, wherein said addressing comprises pointing to a base address greater than $2^{32}$ bytes of contiguous physical memory.

* * * * *